(12) United States Patent
Shinohara et al.

(10) Patent No.: US 6,785,201 B2
(45) Date of Patent: Aug. 31, 2004

(54) OPTICAL INFORMATION RECORDING AND READING APPARATUS

(75) Inventors: Yoko Shinohara, Chiba (JP); Yasuyuki Mitsuoka, Chiba (JP); Manabu Oumi, Chiba (JP); Nobuyuki Kasama, Chiba (JP); Hidetaka Maeda, Chiba (JP); Kenji Kato, Chiba (JP); Susumu Ichihara, Chiba (JP); Takashi Niwa, Chiba (JP); Toshifumi Ohkubo, 10-2, Asagayakita 2-chome, Suginami-ku, Tokyo (JP); Terunao Hirota, 19-5, Shimoshakujii 3-chome, Nerima-ku, Tokyo (JP); Hiroshi Hosaka, 15-1-2-302, Matsudo, Matsudo-shi, Chiba (JP); Kiyoshi Itao, 6-8, Jomyoji 6-chome, Kamakura-shi, Kanagawa (JP)

(73) Assignees: Seiko Instruments Inc., Chiba (JP); Toshifumi Ohkubo, Tokyo (JP); Terunao Hirota, Tokyo (JP); Hiroshi Hosaka, Matsudo (JP); Kiyoshi Itao, Kamakura (JP)

( * ) Notice: Subject to any disclaimer, the term of this patent is extended or adjusted under 35 U.S.C. 154(b) by 243 days.

(21) Appl. No.: 10/177,414

(22) Filed: Jun. 21, 2002

(65) Prior Publication Data

US 2003/0002426 A1 Jan. 2, 2003

(51) Int. Cl.[7] .................................................. G11B 7/00
(52) U.S. Cl. ............................... 369/44.17; 369/44.19; 369/44.23; 369/112.01
(58) Field of Search ........................... 369/44.11, 44.12, 369/44.4, 44.16, 44.17, 44.18, 44.19, 44.23, 112.01, 112.2, 112.26, 112.27

(56) References Cited

U.S. PATENT DOCUMENTS 6,009,064 A * 12/1999 Hajjar .................... 369/112.24
6,324,141 B2 * 11/2001 Takishima et al. ....... 369/53.25

* cited by examiner

Primary Examiner—Muhammad Edun
(74) Attorney, Agent, or Firm—Adams & Wilks

(57) ABSTRACT

It is an optical information recording and reading apparatus for recording and/or reading information at a high density by using a near-field light-generating device as a near-field optical head. The end surface of the core of a flexible optical waveguide is formed in an intermediate position in the optical waveguide and in a portion fixed to the near-field optical head. Light for recording and reading information is spread within the clad. The spread light flux is reflected toward the near-field optical head by a reflective surface formed on the side of one end of the optical waveguide. The reflected light flux is collected by light-collecting structures and then is made to enter an optical minute aperture formed in the near-field optical head. Near-field light is created near the minute aperture. Light scattered by the surface of the recording medium is received. Thus, information on the recording medium can be recorded and read.

9 Claims, 6 Drawing Sheets

OPTICAL INFORMATION RECORDING AND READING APPARATUS

BACKGROUND OF THE INVENTION

1. Field of the Invention

The present invention relates to optical information recording and reading apparatus for recording and/or reading information at a high density by using a near-field light-generating device as a near-field optical head, the device having a minute aperture for producing near-field light.

2. Description of the Related Art

Information recording apparatus using light is evolving toward greater capacities and smaller sizes. Therefore, recording capacities are required to achieve higher densities. As a countermeasure against it, research using a blue-violet semiconductor laser has been conducted. With these techniques, however, an improvement that is only several times of the present recording density can be expected because of the problem of light diffraction limit. In contrast with this, information recording/reading method using near-field light is expected as a technique for treating optical information about a minute area exceeding the light diffraction limit. Today, near-field optical probes permitting optical observation of samples or the like have been put into practical use using the near-field light. Furthermore, using near-field optical heads in information recording apparatus has been discussed.

In this technique, near-field light produced near an optical aperture is utilized, the aperture having a size of less than the light wavelength and formed in a near-field optical head that is a near-field light-generating device. This makes it possible to treat optical information in a region of less than light wavelength that was regarded as a limit for conventional optics. A method of reading optical information can be either collection mode method, in which light is shone onto the surface of a recording medium to produce interaction between near-field light localized around a minute mark and a minute aperture for conversion into scattering light, or illumination mode method in which near-field light produced by a minute aperture is shone onto the surface of a recording medium and scattering light is detected by a separate light-receiving device, the scattering light being converted by interaction with the surface of the recording medium on which information has been recorded by microscopic unevenness or variations in an optical constant such as refractive index. Recording is made by directing near-field light produced by a minute aperture onto the surface of a recording medium and varying the shape of a microscopic area on the medium (heat mode recording) or by varying the refractive index or transmissivity of the microscopic area (photon mode recording). Higher density exceeding those achieved by the prior art information recording apparatus is accomplished by using a near-field optical head having an optical minute aperture exceeding the light diffraction limit.

Under these circumstances, information recording apparatus employing near-field light is generally identical in configuration with magnetic drives and uses a near-field optical head instead of a magnetic head. The near-field optical head has an optical minute aperture and is attached to the front end of a suspension arm. This head is made to float at a given height by making use of pneumatic lubrication, and access to arbitrary data existing on the disk is gained. To cause the near-field optical head to follow the disk rotating at a high speed, a function of stabilizing the posture according to waviness of the disk is given.

In the near-field optical head of this structure, the adopted method of supplying light to the aperture consists of connecting optical fiber or optical waveguide with the near-field optical head and directing light coming from a light source into a minute aperture formed in the near-field optical head.

In this information recording apparatus, light flux having some spread and shone from the end surface of the optical waveguide is reflected by a mirror or the like and directed into the minute aperture. Therefore, the energy density of the light near the minute aperture decreases. This reduces the intensity of near-field light produced from the minute aperture.

Accordingly, a lens is mounted between the end surface of the optical waveguide and the minute aperture. The light flux shone from the end surface of the optical waveguide is collected to the vicinities of the minute aperture by a lens, intensifying the near-field light produced from the minute aperture. Thus, the efficiency of utilization of the light is enhanced. The focused light spot is narrowed by using a lens with a high NA. The light energy can be concentrated to a smaller area. The intensity of the near-field light produced near the minute aperture can be increased by placing the minute aperture at this focal spot. The light flux from the light source can be utilized efficiently.

The above-described information recording apparatus is made up of a large number of components including the optical waveguide and mirror. The number of adjusted parts is also increased. Consequently, the cost is increased due to deteriorated performance and prolonged adjustment time.

Accordingly, in Japanese patent laid-open No. 2000-215494, a flexible rodlike optical waveguide is used, and a reflective surface for reflecting at least a part of light propagating within a core on a clad is formed at the side of one end of the optical waveguide. A light-shielding film for blocking transmission of light is formed on the surface of the clad around the portion through which the light reflected by the reflective surface is transmitted. A part of the light-shielding film is cut away to form an aperture portion smaller than the wavelength of the used light. Near-field light is produced from this aperture portion to thereby realize a cantilevered pickup. Thus, optical information recording apparatus of quite simple structure is offered.

The information recording apparatus fabricated by preparing optical waveguide, mirror, lenses, and so on separately and assembling them is required to efficiently guide light flux from a light source to a minute aperture formed in a near-field optical head in order to produce the sufficiently strong near-field light from the minute aperture and to realize recording and reading of ultrahigh-density information, as well as high S/N. Therefore, the optical waveguide (e.g., thin-film optical waveguide, optical fiber, or the like), mirror, and lenses are necessary. This increases the number of components, which in turn increases the number of locations to be adjusted. This leads to increase the cost. Furthermore, the added components increase the weight of the near-field optical head. Where the head is made to perform a seek operation at a high speed, residual vibration increases. This makes it difficult to record and read information at a high speed.

In the information recording apparatus using the optical pickup of Japanese patent laid-open No. 2000-215494, light flux propagating inside the core of the optical waveguide is reflected by the reflective surface toward the direction in which the light passes through the clad, and thus the flux is guided to the minute aperture. Therefore, the reflected light flux has an angle of spread and is guided to the minute aperture while dispersing. Therefore, the energy density of light flux in the minute aperture drops, making it impossible to create sufficiently strong near-field light near the minute aperture. Accordingly, attempts are made to increase the energy density of the light flux guided to the minute aperture. In particular, a quite small ball lens is inserted between the minute aperture and the core on which the reflective surface is formed in order to increase the NA of the light flux entering the minute aperture and to increase the energy density of the light flux at the minute aperture.

The NA of the light flux entering the minute aperture can be increased by increasing the diameter of the light flux incident on the lens and using a lens having a short focal distance. To increase the diameter of the light flux incident on the lens, it is necessary to set the distance from the core end surface to the lens to a sufficiently large value.

However, a rodlike optical waveguide having flexibility normally has a thickness of less than about 100 µm and therefore it is difficult to increase the NA in order to increase the energy density of the light flux entering the minute aperture. Although the NA of the light flux entering the minute aperture can be increased by increasing the thickness of the optical waveguide and increasing the distance between the core on which the reflective surface is formed and the ball lens, the flexibility of the optical waveguide is deteriorated. Furthermore, the optical pickup is thickened, elevating the position of the center of gravity. This makes it difficult to perform high-speed tracking.

SUMMARY OF THE INVENTION

It is an aspect of the present invention to provide inexpensive information recording apparatus which efficiently guides light flux from a light source to a minute aperture, avoids increases in the number of components, reduces the mass of the near-field optical head, produces stronger near-field light near the minute aperture, performs high-speed tracking, records and reads information at an ultrahigh density and at a high speed, and increases the S/N of the read signal.

It is another aspect of the present invention to provide first optical information recording and reading apparatus that makes use of near-field light and comprises: a light source; a near-field optical head; a rodlike optical waveguide for transmitting light from said light source, the waveguide supporting said near-field optical head and having flexibility; a core formed within said optical waveguide; a reflective surface formed in a surface of said optical waveguide opposite to an end surface on the side of said light source, the reflective surface acting to reflect at least a part of light propagating inside said optical waveguide toward said near-field optical head; light-collecting structures for collecting light reflected by said reflective surface; an optical minute aperture portion formed in said near-field optical head; a recording medium; a light-receiving portion; a suspension arm that supports said optical waveguide; and an actuator for moving relative positions of said minute aperture and said recording medium. This apparatus is characterized in that an end surface perpendicular to the direction of propagation of light in said core is formed in an intermediate position of said optical waveguide and located in a part fixed to said near-field optical head.

Therefore, ultrahigh-density recording and reading of information are enabled by using near-field light. In addition, light flux having a high energy density can be collected into the minute aperture in the near-field optical head. Consequently, the strength of the near-field light produced near the minute aperture is increased. This can immensely increase the efficiency of utilization of light. This makes it unnecessary to use a high-power laser. Heat generation from the laser can be suppressed. Hence, lower power consumption and miniaturization of the apparatus are enabled. In this way, optical information recording and reading apparatus capable of increasing the S/N of the read signal and realizing high-speed recording and reading is offered.

Since the reflective surface, core, and optical waveguide can be integrally formed, it is not necessary to align them to each other. The number of components can be reduced. Furthermore, the core end that is the exit end for light is formed in the region bonded to the near-field optical head. Therefore, if the near-field optical head swings relative to the optical waveguide, the relative positions of the reflective surface, core end, and minute aperture do not vary. Consequently, it is easy to guide a given amount of light into the minute aperture.

Therefore, information recording and reading apparatus permitting a further decrease in the cost of the apparatus and stabilization of the intensity of near-field light produced near the minute aperture can be offered.

It is another aspect of the present invention to provide second optical information recording and reading apparatus, wherein the above-described light-collecting structures are lens structures formed in the near-field optical head described above.

It is another aspect of the present invention to provide third optical information recording and reading apparatus, wherein the above-described light-collecting structures are formed in the above-described optical waveguide.

Therefore, the number of components can be reduced further, in addition to the advantages of the first information recording and reading apparatus according to the invention, because the light-collecting structures and the near-field optical head or the light-collecting structure and the optical waveguide can be integrated. This can lead to a further decrease in the size of the apparatus. The apparatus can be fabricated with lower cost.

It is another aspect of the present invention to provide fourth optical information recording and reading apparatus, wherein the above-described optical waveguide is provided with cutouts to form at least one beam supported at its both ends. The near-field optical head is resiliently supported.

Therefore, the advantages of any one of the first through third optical information recording and reading apparatuses according to the invention can be had. In addition, the both end-supported beam structure formed in the optical waveguide is operated as a spring to maintain constant the distance between the minute aperture and the recording medium. In consequence, the number of components can be reduced further. The cost can be curtailed further.

It is another aspect of the present invention to provide fifth optical information recording and reading apparatus, wherein the above-described core is formed within the both end-supported beam structure formed in said optical waveguide.

The advantages of the fourth optical information recording and reading apparatus according to the invention can be had. In addition, the optical waveguide can be formed without sacrificing the light transmission function and the function of maintaining constant the distance between the minute aperture and the recording medium. In consequence, the apparatus can be miniaturized further.

DETAILED DESCRIPTION OF THE PREFERRED EMBODIMENTS

Figure 1:
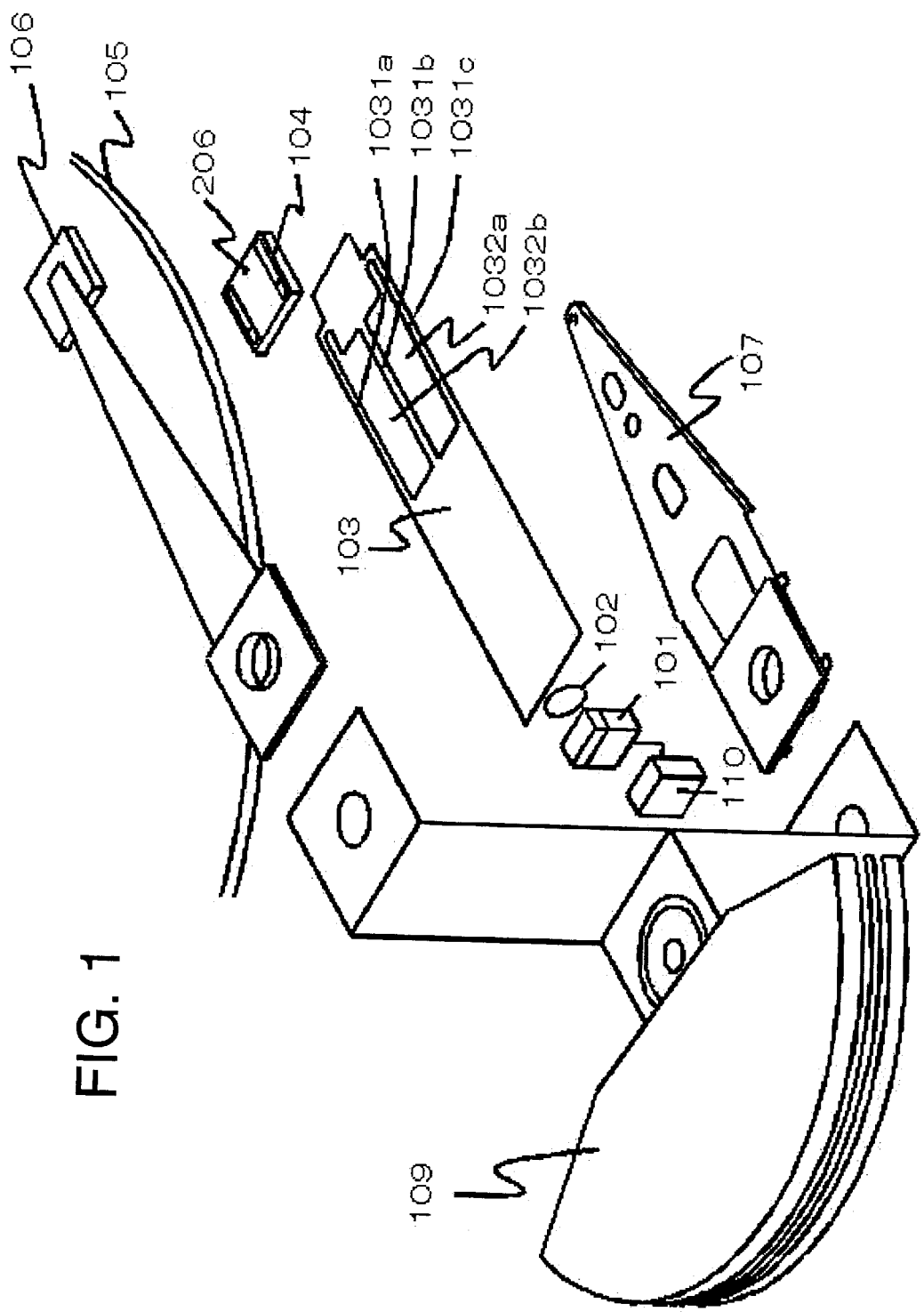
FIG. 1 is a view illustrating the configuration of optical information recording and reading apparatus according to embodiment 1 of the invention.

This invention is hereinafter described in detail by referring to the drawings. Note that this invention is not limited to these embodiments.

Embodiment 1

FIG. 1 is a view illustrating the configuration of optical information recording and reading apparatus of the present embodiment 1.

Information recording and reading apparatus according to the present embodiment is fundamentally similar in construction with the conventional magnetic disk drive. A near-field optical head 104 formed with a minute aperture 206 is mounted in an optical waveguide 103. The optical waveguide 103 is supported to a suspension arm 107. The near-field optical head 104 is so positioned that the minute aperture 206 is facing a recording medium 105. The suspension arm 107 is mounted to a voice coil motor (hereinafter abbreviated VCM) 109. A light-receiving head 106 is mounted to the VCM 109 such that the head is opposite to the near-field optical head 104 with the recording medium 105 therebetween at all times.

When the recording medium 105 is rotated at a high speed, the near-field optical head 104 floats at a quite small height of about tens of nanometers above the surface of the recording medium 105. The near-field optical head 104 can be moved substantially radially of the recording medium 105 by the VCM 109. At this time, the light-receiving head mounted to the VCM 109 similarly moves substantially radially.

Light flux from a laser 101 is collected by a lens 102 and guided to the optical waveguide 103 consisting of a core and a clad. The light is passed through the optical waveguide 103 and guided to the minute aperture 206 formed in the near-field optical head 104, producing near-field light. Scattering light scattered by the surface of the recording medium 105 is detected by the light-receiving head 106. At this time, if necessary, the laser 101 can be intensity-modulated by circuitry 110.

The structure of the near-field optical head of the present embodiment 1 is next described.

Figure 2A:
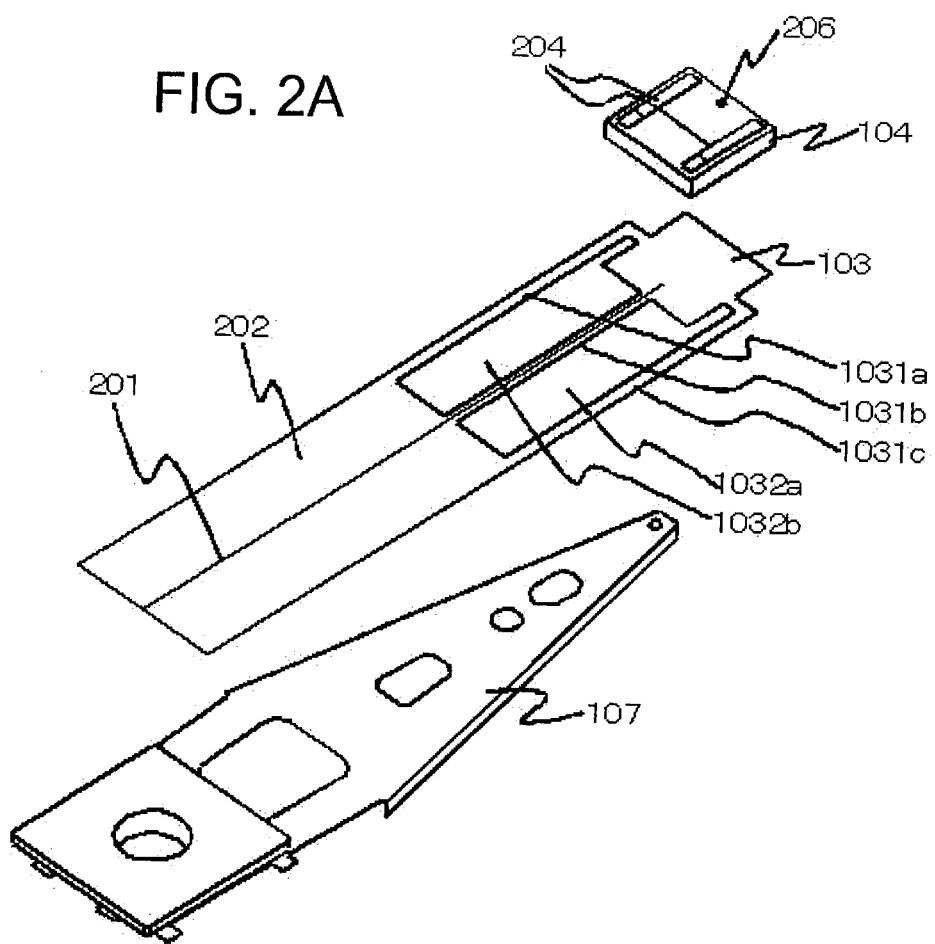
FIG. 2 is a view illustrating the near-field optical head and optical waveguide of optical information recording and reading apparatus according to the embodiment 1 of the invention.
Figure 2B:
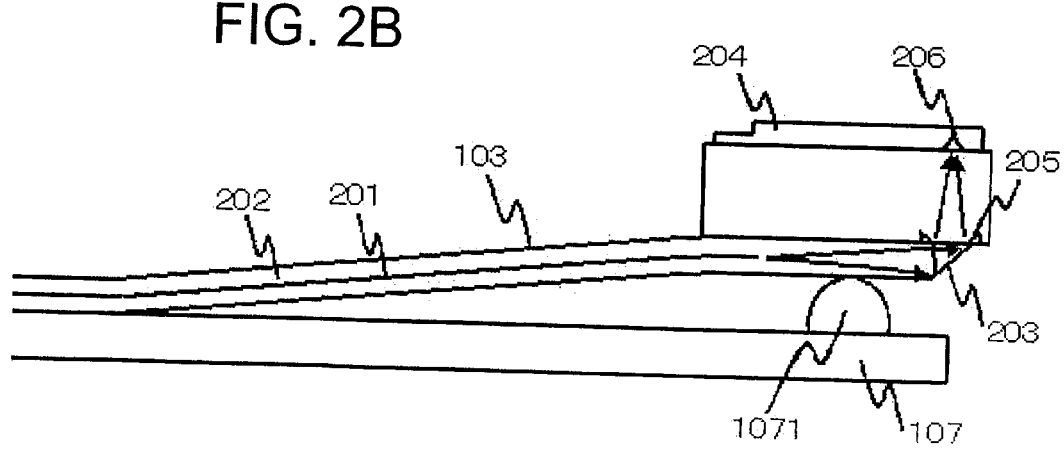

FIG. 2 is a view illustrating the optical waveguide 103 and near-field optical head 104 of the optical information recording and reading apparatus according to the present embodiment 1.

A structure for maintaining the near-field optical head 104 at a short and constant distance from the recording medium 105 is first described.

An air bearing surface (hereinafter abbreviated as ABS) 204 is formed on the near-field optical head 104. The near-field optical head 104 is bonded to the optical waveguide 103 on the opposite side of the ABS 204. Cutouts 1032a and 1032b are formed in the optical waveguide 103, thus forming thin beam structures 1031a, 1031b, and 1031c each of which is supported at its both ends. The near-field optical head 104 is mounted at one end of the both end-supported beam structures 1031a, 1031b, and 1031c. The suspension arm 107 is mounted at the other ends. At this time, the optical waveguide 103 is pushed by a dimple 1071 mounted close to the suspension arm 107. All of the both end-supported beam structures 1031a, 1031b, and 1031c bend and deform. Therefore, the optical waveguide 103 is pressed into contact with a quite small area of the dimple 1071. Furthermore, the both end-supported beam structures 1031a, 1031b, and 1031c act as quite weak springs and so the near-field optical head 104 mounted to the optical waveguide 103 can swing about the dimple 1071. For example, the optical waveguide 103 is made from a resin. The length of the both end-supported beam structures 1031a, 1031b, and 1031c is set to be about 4 to 5 mm. Their width is set to be hundreds of micrometers. Their thickness is set to be tens of micrometers. In this case, the torsional rigidities in the longitudinal and lateral directions are as low as about tens of $\mu$N·m/rad.

If the near-field optical head 104 supported in this way is placed close to the recording medium 105, and if the recording medium 105 is rotated at a high speed, the near-field optical head 104 floats at a height of approximately tens of nanometers above the surface of the recording medium 105. In addition, if the recording medium 105 vibrates due to undulation during rotation, the spring action of the air stream between the recording medium 105 and the near-field optical head 104 is stronger than the torsional rigidities of the both end-supported beam structures 1031a, 1031b, and 1031c. Consequently, the floating posture of the near-field optical head 104 swings about the dimple 1071, so that the distance between the minute aperture 206 and the recording medium 105 can be kept constant.

The structure of optics for recording and reading information on the recording medium 105 is next described.

A core 201 and a clad 202 are formed in the optical waveguide 103. A reflective surface 203 formed to shine light onto the near-field optical head 104 is formed on the side of one end surface of the optical waveguide 103. The core 201 does not reach the reflective surface 203 but is interrupted in the optical waveguide 103, thus forming an end surface. A core end surface located before the reflective surface 203 is formed at the region where the optical waveguide 103 and the near-field optical head 104 are bonded together. The region from the core end surface to the reflective surface 203 is made from the same material as the clad 202.

A microlens 205 is formed opposite to the minute aperture 206 and ABS 204 formed at the tip of the substantially conical structure on the side of the ABS 204 in the near-field optical head 104. The other portions are covered with a light-shielding film (not shown). The microlens 205 collects light flux from the optical waveguide 103 into the minute aperture 206. The optical waveguide 103 consisting of the core 201 and clad 202 is fixedly mounted to the surface of the near-field optical head 104 on the side of the microlens 205. Here, the microlens 205, ABS 204, and minute aperture 206 are integrally formed on a transparent glass plate or substrate. The glass plate used to fabricate the near-field optical head 104 transmits the wavelength of the light of the laser 101. For instance, a silicon substrate may also be used. Only the microlens 205 and the portion through which the light flux is transmitted may be made of a material that transmits the wavelength of the used light.

A normal spherical lens, aspherical lens, refractive index distribution lens, Fresnel lens, or the like may be used as the microlens 205. Especially, where a Fresnel lens is used, a planar lens can be built. Even if a lens having a large diameter is fabricated, the thicknesses of the lens structures and near-field optical head can be reduced. Fresnel lenses can be mass-produced by photolithography.

The behavior of light that records and reads information on the recording medium 105 is described.

Light from the laser 101 is colleted by the lens 102, shone onto the end surface of the core 201 on the side of the laser, and transmitted through the core 201. The transmitted light flux is made to exit into a medium having the same index of refraction as that of the clad 202 from the core end surface located before the reflective surface 203. The exiting light is reflected as diverging light flux having some angle of spread by the reflective surface 203 and travels toward the near-field optical head 104. The diverging light flux having such spread is collected into the minute aperture 206 by the microlens 205 formed on the near-field optical head 104, creating near-field light near the minute aperture 206 on the side of the recording medium 105.

At this time, the core 201 of the optical waveguide 103 is interrupted. The microlens 205 is spaced from the core end surface. Therefore, it is possible to set the radius of light flux shone onto the microlens 205 to a large value. The NA of the light flux incident on the minute aperture 206 can be increased by collecting the light flux into the minute aperture 206 by the microlens 205. Consequently, the spot size of the light flux collected into the minute aperture 206 can be reduced. Thus, light flux with high energy density can be shone by means of the minute aperture. Hence, the intensity of near-field light produced near the minute aperture 206 can be increased.

For example, in the present embodiment, the distance from the core end surface to the microlens 205 can be set to approximately 1 mm. Assuming that the angle of spread at the core end surface of the light flux exiting from the core 201 is 0.1 (NA=0.1), the light flux can be increased to a radius of about 100 μm by the microlens 205. If it is assumed that the thickness of the near-field optical head 104 is 400 μm and that the index of refraction of glass forming the near-field optical head is 1.7, the NA of light flux entering the minute aperture 206 is in excess of 0.4. The light flux is concentrated in the minute aperture 206. The energy density increases. The intensity of the near-field light produced near the minute aperture 206 is increased. Where a Fresnel lens is used as the microlens 205, for example, a thin-type near-field optical head can be fabricated even if the lens radius is increased. The NA of the light flux entering the minute aperture can be increased further by shortening the distance between the lens surface and the minute aperture.

As described thus far, light of high and constant intensity can be guided to the minute aperture 206 at all times by the structure of the near-field optical head 104 and optical waveguide 103. Stable and intense near-field light can be created.

A method of reading information recorded on the recording medium 105 and recording information is next described by referring to FIGS. 1 and 2.

In FIG. 1, the near-field optical head 104 having the minute aperture is made to float at a given height and gains access to arbitrary data marks existing on the recording medium 105. At this time, light flux exiting from the laser 101 passes through the lens 102 and the core 201 of the optical waveguide 103 and exits from the core end surface with some angle of spread. Then, the light is reflected by the reflective surface 203. The spread light flux is collected by the microlens 205 and shone onto the minute aperture 206, thus creating near-field light. As a result of interaction between the near-field light and the recording medium 105, scattering light produced on the surface of the recording medium 105 is received by the light-receiving head 106 fixed in an opposite relation to the near-field optical head 104 with the recording medium 105 therebetween. The light is converted into an electrical signal and transmitted to circuitry (not shown). If necessary, it is amplified. In this way, a read signal about information occurs.

Recording of information onto the recording medium 105 is accomplished by moving the near-field optical head 104 having a minute aperture into a desired position on the recording medium while placing the recording medium 105 and the minute aperture close to each other and shining near-field light onto the recording medium 105 from the minute aperture to perform a writing operation.

Note that in the present embodiment, the near-field optical head 104 for producing near-field light and the light-receiving head 106 are separately fixed. It may also be implemented by one suspension arm by integrating the near-field optical head 104 and the light-receiving head 106.

A method of fabricating the optical waveguide 103 used in the present embodiment is next described.

Figure 3:
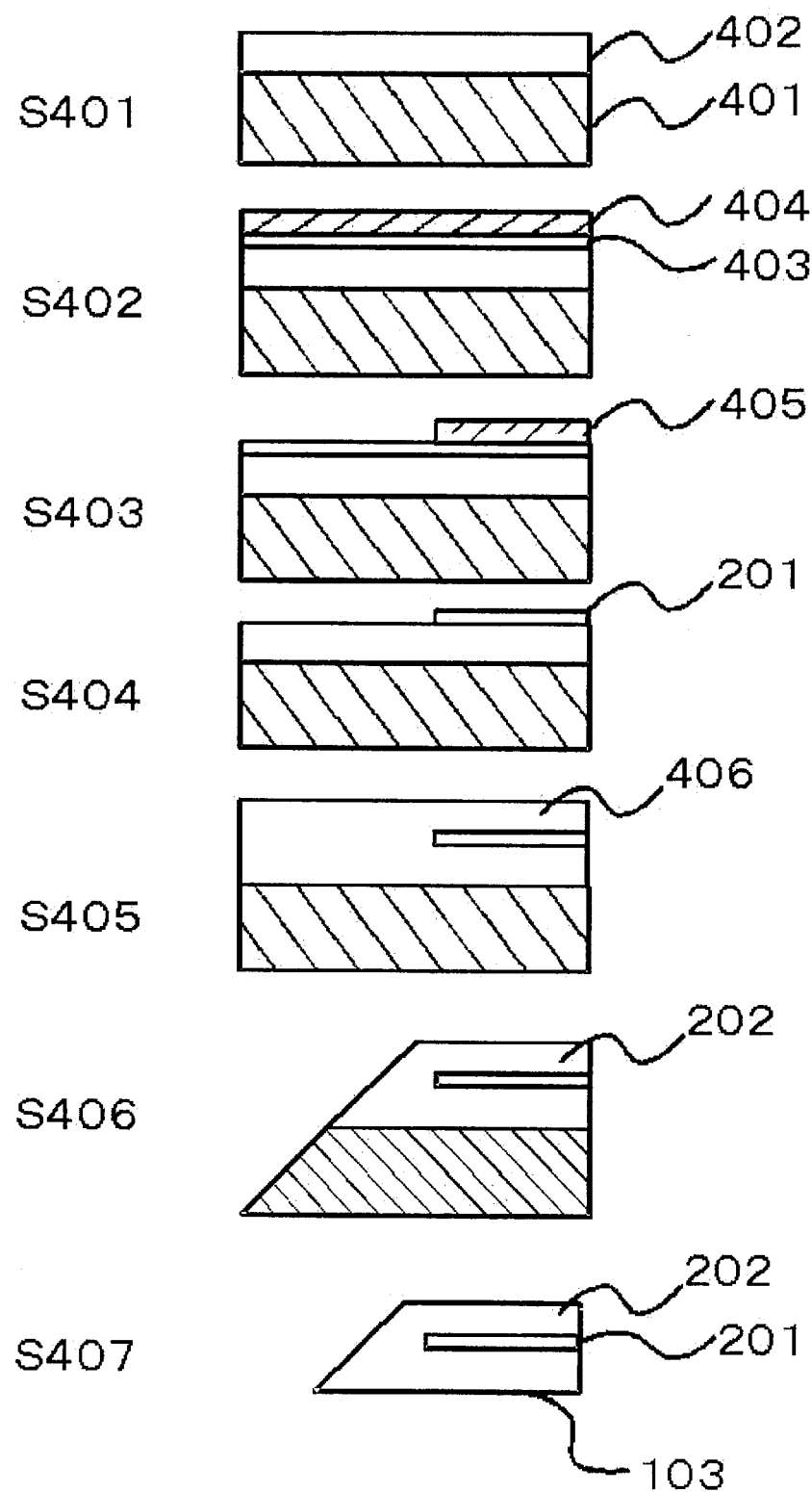
FIG. 3 is a view illustrating a method of fabricating the optical waveguide according to the embodiment 1 of the invention.

FIG. 3 is a view showing a method of forming an optical waveguide according to the present embodiment 1.

First, in step S401, a silicon substrate 401 is used as a base. A quartz-based material such as silicon oxide or silicon nitride or a dielectric material such as a high polymer (e.g., polyimide or polymethacrylate) is deposited as a low refractive index layer 402 forming a clad on the silicon substrate 401. In the case of silicon oxide that is a dielectric material, the layer can be easily formed by sputtering, CVD (chemical vapor deposition), or vacuum evaporation. Furthermore, with respect to a plastic material such as polyimide or polymethacrylate, a liquid plastic may be applied and cured as a layer. A glass substrate may also be used as the substrate other than the silicon substrate 401. Taking account of the flatness of the substrate, ease of availability, cost, and so on, a silicon substrate generally widely spread in the field of semiconductors is used.

Then, in step S402, a high refractive index layer 403 becoming a core with a higher index of refraction than that of the low refractive index layer 402 is formed on low refractive index layer 402 in step S401 by the same method as used to form the low refractive index layer 402. Where a quartz-based material such as silicon oxide is used, the refractive index can be increased by implanting germanium during formation of the film. A resist film 404 is formed on the high refractive index layer 403 by spin coating or other method.

Then, in step S403, the resist film 404 is patterned as a mask material for forming a core shape by using photolithography used for normal semiconductor fabrication steps. In this way, resist 405 of core shape is formed.

Then, in step S404, the high refractive index layer 403 is etched using the core shape resist 405 for forming a core. Then, the core shape resist 405 that is a mask material is removed, thus patterning the core 201.

Then, in step S405, the low refractive index layer 406 is formed to cover the patterned core 201. In this way, an optical waveguide having a core end surface within the optical waveguide is formed.

Then, in step S406, the optical waveguide and the silicon substrate 401 are diced such that the end surface of the optical waveguide forms an angle of 45 degrees. A reflective surface is formed. The optical waveguide 103 consisting of the core 201 and clad 202 is formed.

Finally, in step S407, the silicon substrate 401 is removed. The optical waveguide 103 in which the end surface of the clad 202 has an angle of 45 degrees and the core 201 terminates in an intermediate position can be fabricated. If necessary, a reflective surface is formed on the reflective surface of 45 degrees.

Dicing is used here to form the reflective surface of 45 degrees. Other methods may also be employed. For instance, the clad 202 may be isotropically etched using a photolithographic technique.

The angle of the reflective surface is preferably 45 degrees. The angle is not always required to be 45 degrees. Where the reflective surface is 45 degrees, however, the optical axis of light flux reflected by the reflective surface is incident normal to the microlens created in the near-field optical head and so light can be collected in the minute aperture without aberration. The intensity of the near-field light created near the minute aperture is higher than where the angle of the reflective surface is other than 45 degrees.

Accordingly, as described thus far, in the optical information recording and reading apparatus according to the present embodiment, recording and reading at a recording density exceeding the diffraction limit of light can be accomplished by using interaction owing to near-field light in reading and recording information on a recording medium. Furthermore, light flux with high energy density can be collected in the minute aperture in the near-field optical head by combining the optical waveguide consisting of a core and a clad, the reflective surface remote from the core end surface, and the microlens formed in the near-field optical head. The intensity of the near-field light created near the minute aperture can be increased. The efficiency of utilization of light can be increased immensely. This makes it unnecessary to use a high-power laser. Heat generation from the laser can be suppressed. Lower power consumption and miniaturization of the apparatus are permitted.

In addition, the intensity of scattered light produced as a result of interaction of light incident on the light-receiving head with the recording medium can be increased. The S/N of the read signal can be increased. Also, higher-speed reading is enabled. In the present embodiment, information recorded on a recording medium is read by making use of transmission. The invention can also be applied to a case where information recorded on a recording medium is read by making use of reflection such as normal CD or DVD. In this case, the method can be realized by using a near-field optical head having a light-receiving head fabricated close to the minute aperture.

Moreover, the optical waveguide consisting of the core and clad and the reflective surface remote from the core end surface interrupt the core in an intermediate position in the optical waveguide and can be integrally fabricated as an optical waveguide in which the core end surface is located ahead of the reflective surface. Therefore, it is not necessary to align the core end surface and the reflective surface. The number of components can be reduced. In addition, the relative positions of the core end surface, the reflective surface, and the minute aperture do not vary regardless of the posture of the near-field optical head. Therefore, near-field light of constant intensity can be generated at all times. Consequently, the cost of the apparatus can be reduced further. The intensity of near-field light produced near the minute aperture can be stabilized. Information recording and reading apparatus capable of recording information on a recording medium at a high speed can be offered.

Where the reflective surface is a tilted surface of 45 degrees, the optical axis of light flux reflected by the reflective surface is incident normal to the microlens formed in the near-field optical lens. Therefore, the light can be collected into the minute aperture without aberration. In consequence, the intensity of near-field light created near the minute aperture is stronger than where the angle of reflective surface is other than 45 degrees. This improves the utilization of light. Lower power consumption and further miniaturization can be attained. The S/N can be enhanced further. Also, higher-speed recording and reading are permitted.

Where the lens function of a head for a near-field optical head is realized with a microlens, a thin-type near-field optical head can be fabricated even if the lens diameter is increased. The NA of light flux entering the minute aperture can be increased further by decreasing the distance between the lens surface and the minute aperture. Lower power consumption, further miniaturization of the apparatus, higher S/N, and higher-speed recording and reading can be achieved. In addition, Fresnel lenses can be mass-produced. The cost can be reduced.

Moreover, the number of components can be reduced further and the assembly and adjustment times can be reduced by operating the both end-supported beam structures mounted in the optical waveguide as springs and imparting a function of maintaining constant the distance between the minute aperture and the recording medium to them.

Embodiment 2

The configuration of optical information recording and reading apparatus according to the present embodiment 2 is described.

In the present embodiment, the shape of the optical waveguide and the structures for supporting the near-field optical head in the embodiment 1 are modified. Therefore, description of the same portions as those of the embodiment 1 is omitted.

Figure 4A:
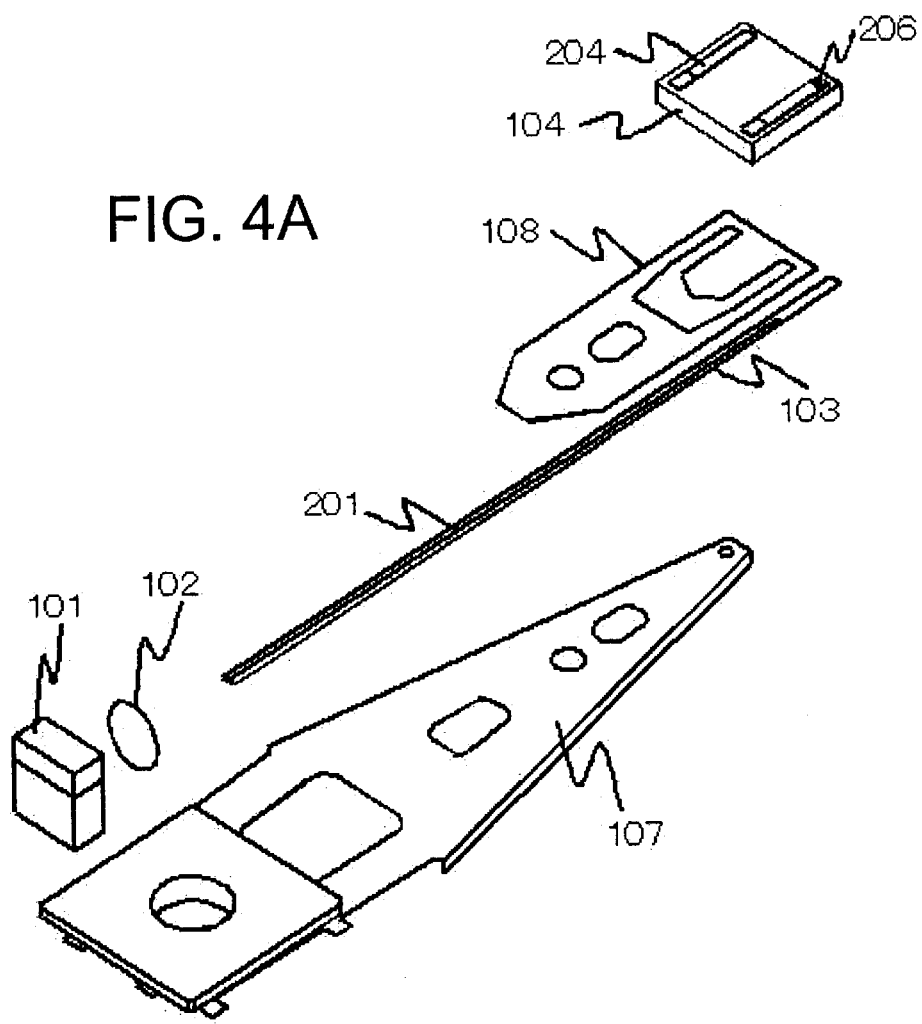
FIG. 4 is a view illustrating the near-field optical head and optical waveguide of optical information recording and reading apparatus according to embodiment 2 of the invention.
Figure 4B:
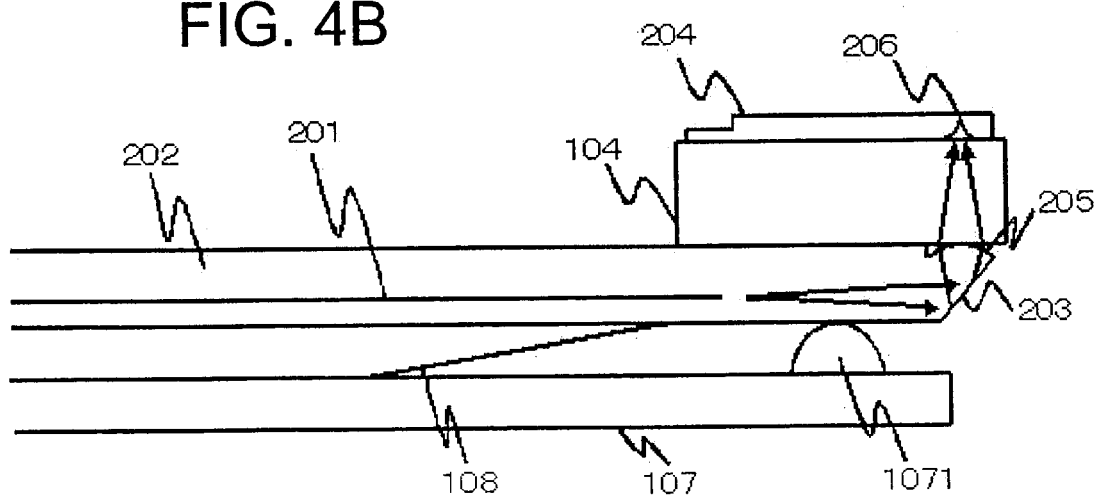

FIG. 4 is a view illustrating a near-field optical head in optical information recording and reading apparatus according to the embodiment 2 and the structures of its peripheries. The configuration differs from the embodiment 1 in that the near-field optical head 104 is fixed to a flexure 108, which in turn is supported to the suspension arm 107. With respect to the optical waveguide 103, the near-field optical head 104 is connected to the side of the reflective surface 203, while the laser 101 and the lens 102 are mounted on the side of the other end in the same way as in the embodiment 1.

The flexure 108 has two both end-supported beam structures owing to a substantially U-shaped cutout. Since the two both end-supported beam structures formed in the flexure 108 act as springs, the flexure 108 serves to maintain constant the distance between the near-field optical head 104 and the recording medium (not shown), in the same way as in the both end-supported beam structures formed in the optical waveguide of the embodiment 1.

The optical configuration is similar to that of the embodiment 1. Since the core end is formed in a region fixed to the near-field optical head 104, light propagated in the optical waveguide 103 exits at an angle of spread from the core end existing within the region fixed to the near-field optical head 104, is collected by the microlens 205, is shone on the minute aperture 206, and creates near-field light near the minute aperture 206.

The spring function of maintaining constant the distance between the near-field optical head 104 and the recording medium is separated from the optical waveguide 103 in this way. Therefore, the optical waveguide 103 does not bend. If the optical waveguide 103 bent, the efficiency of propagation of light would deteriorate. In the structure in which the optical waveguide 103 does not bend as in the present embodiment, still intenser light can be made to enter the minute aperture 206, so that the intensity of the generated near-field light can be increased. In addition, the relative positional relation from the core end to the minute aperture 206 does not vary in the same way as in the embodiment 1. Therefore, near-field light of constant and high intensity can be created irrespective of the posture of the near-field optical head 104. The S/N can be enhanced. Signals can be recorded and read at a higher speed.

Embodiment 3

The configuration of optical information recording and reading apparatus according to embodiment 3 is described.

The present embodiment is similar to the embodiment 1 or 2 except that the structure of the optical waveguide is modified. Therefore, description of those parts which are identical with their counterparts of the embodiments 1 and 2 is omitted.

Figure 5:
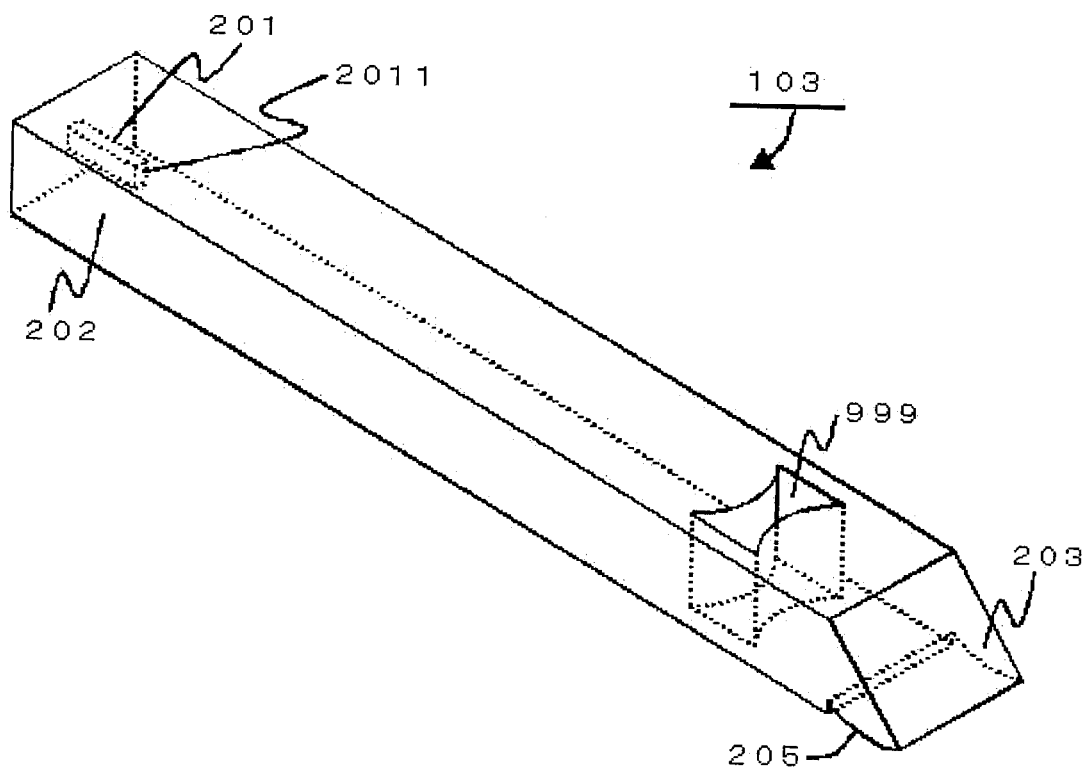
FIG. 5 is a view illustrating the optical waveguide in optical information recording and reading apparatus according to embodiment 3 of the invention.
Figure 6A:
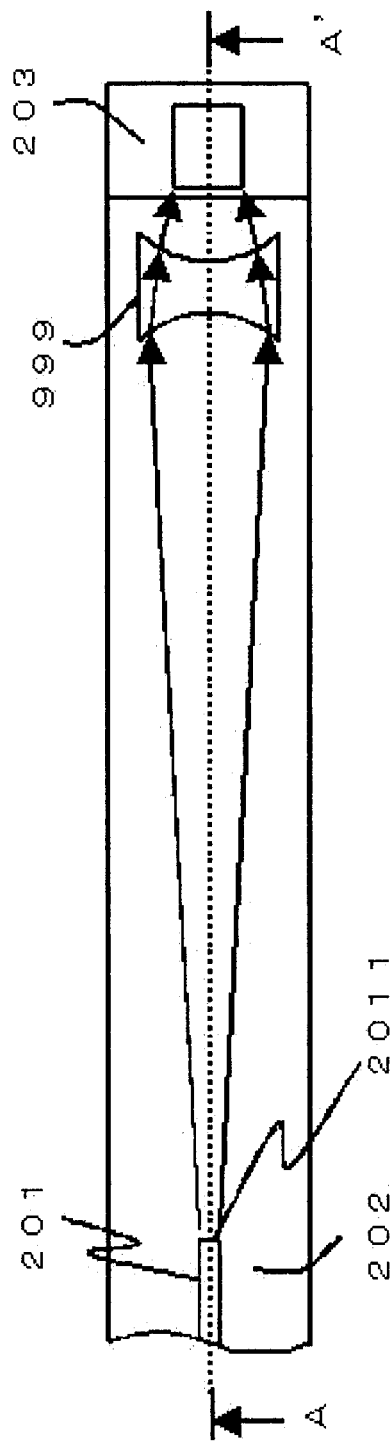
FIG. 6 is a view illustrating the optical waveguide in optical information recording and reading apparatus according to the embodiment 3 of the invention.
Figure 6B:
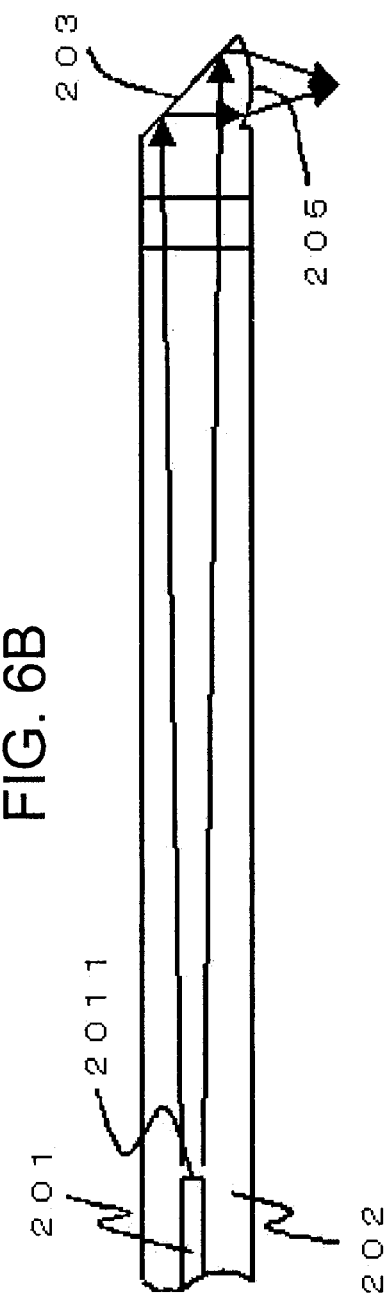

FIG. 5 shows the structure of the optical waveguide 103 in the optical information recording and reading apparatus according to the embodiment 3, especially the structure of the part connected with the near-field optical head (not shown). FIG. 6(*a*) is a top plan view of the optical waveguide 103. FIG. 6(*b*) is a cross-sectional view on A–A' of FIG. 6(*a*).

The difference with the embodiment 1 or 2 is that a drum-like cutout 999 for collecting light is formed inside the optical waveguide 103. This light-collecting cutout 999 is located between a core end 2011 and the reflective surface 203.

If light propagating inside the core 201 of the optical waveguide 103 exits from the core end 2011 within the optical waveguide 103 at an angle of spread, the light enters the light-collecting cutout 999. The incident light is collected only in the lateral direction of the optical waveguide 103 by the light-collecting cutout 999. The light spreads in other directions and propagates. Furthermore, the path of the light is bent at right angles by the reflective surface 203, collected only in the longitudinal direction of the optical waveguide 103 by the microlens 205, and shone onto the minute aperture (not shown) formed in the near-field optical head (not shown). Because the direction of collection by the light-collecting cutout 999 and the direction of collection by the microlens 205 are perpendicular to each other, the light flux can be made to enter the minute aperture while narrowing the flux. Since two dimensional shapes are placed on top of each other in this way, light can be collected into the minute aperture similarly to a three-dimensional lens. Because the light-collecting action of the light-collecting cutout 999 and microlens 205 is affected by the radius of curvature of the curved surface and by the index of refraction of the clad, the radius of curvature is determined in a stage when the distance to the minute aperture and the index of refraction of the clad are designed. Further, a separate microlens may be mounted in the near-field optical head to collect light. In this case, since the NA of the optical system can be made larger, the efficiency of conversion into near-field light can be enhanced further.

The optical waveguide 103 in the present embodiment can be fabricated by a method similar to the method of the embodiment 1 shown in FIG. 3. However, in order to fabricate the microlens 205, a structure having topography inverted relative to that of the microlens 205 is previously formed on the silicon substrate 401 used as a substrate and the low refractive index layer 402 becoming a clad is formed on it. Since the low refractive index layer 402 transfers the topography of the substrate, the structure of the microlens 205 can be formed. When the contour of the optical waveguide 103 is etched, the light-collecting cutout 999 can be simultaneously formed. Therefore, if two-dimensional shape machining is used, functions similar to those of a lens having a three-dimensional shape can be accomplished. In consequence, cheap mass-production is permitted.

Light propagating in the optical waveguide can be collected and guided to the minute aperture similarly to a lens having a three-dimensional shape by combining the light-collecting cutout 999 and the microlens 205 and collecting light in this way, in addition to the advantages of the embodiment 1 or 2. Therefore, if two-dimensional shape machining is used, functions similar to those of a lens having a three-dimensional shape can be realized. Consequently, cheap mass-production is enabled.

As described thus far, the first optical information recording and reading apparatus according to the present invention makes it possible to record and read information at an ultrahigh density by the use of near-field light. Since the relative positions of optics from the core end surface to the minute aperture do not vary, a constant amount of light flux can be guided to the minute aperture irrespective of variations in the posture of the near-field optical head when floating over a recording medium. Furthermore, spread light flux is collected by the microlens and so light flux having a high energy density can be collected into the minute aperture in the near-field optical head. Therefore, the intensity of near-field light produced near the minute aperture is stabilized and increased. This immensely increases the efficiency of utilization of light. Also, stabilization can be attained. Hence, it is not necessary to use a high-power laser. Heat generation from the laser can be suppressed. Lower power consumption and miniaturization of the apparatus can be accomplished. The S/N of the read signal can be enhanced. Information recording and reading apparatus that realizes high-speed recording and reading can be offered.

Furthermore, optical information recording and reading apparatus can be offered in which the reflective surface and optical waveguide remote from the core end surface can be integrally fabricated. Therefore, it is not necessary to align the core end surface and reflective surface. The number of components can be reduced. Consequently, the cost of the apparatus can be reduced further. The intensity of near-field light produced near the minute aperture can be stabilized.

As described thus far, the second optical information recording and reading apparatus according to the present invention yields the advantages of the first optical information recording and reading apparatus according to the invention. In addition, the near-field optical head and light-collecting structures can be fabricated as an integrated structure.

As described thus far, the third optical information recording and reading apparatus according to the present invention yields the advantages of the first optical information recording and reading apparatus according to the invention. In addition, the optical waveguide and light-collecting structures can be fabricated as an integrated structure. In consequence, the size of the apparatus can be reduced further. The number of components can be reduced. The assembly and adjustment times can be shortened. The cost can be reduced.

As described thus far, the fourth optical information recording and reading apparatus according to the present invention yields the advantages of the first through third optical information recording and reading apparatus according to the invention. In addition, the optical waveguide resiliently supports the near-field optical head, and both end-supported beam structures mounted in the optical waveguide are operated as springs. A function of maintaining constant the distance between the minute aperture and the recording medium can be imparted. Therefore, the number of components can be reduced further. Lower cost can be accomplished.

As described thus far, the fifth optical information recording and reading apparatus according to the present invention yields the advantages of the fourth optical information recording and reading apparatus according to the invention. In addition, the optical waveguide can be fabricated without sacrificing either the function of transmitting light or the function of maintaining constant the distance between the minute aperture and the recording medium. Therefore, the number of components can be reduced further. The cost can be reduced further.

What is claimed is:

1. Optical information recording and reading apparatus making use of near-field light, comprising:
    a light source;
    a near-field optical head;
    a rodlike optical waveguide for transmitting light from said light source, the waveguide supporting said near-field optical head and having flexibility;
    a core formed within said optical waveguide;
    a reflective surface formed in a surface of said optical waveguide opposite to an end surface on the side of said light source, the reflective surface acting to reflect at least a part of light propagating inside said optical waveguide toward said near-filed optical head;
    light-collecting structures for collecting light reflected by said reflective surface;
    an optical minute aperture portion formed in said near-field optical head;
    a recording medium;
    a light-receiving portion;
    a suspension arm that supports said optical waveguide; and
    an actuator for moving relative positions of said minute aperture portion and said recording medium;
    wherein an end surface perpendicular to the direction of propagation of light in said core is formed in an intermediate position in said optical waveguide, and wherein said end surface is located in a portion fixed to said near-field optical head.

2. Optical information recording and reading apparatus as set forth in claim 1, wherein said light-collecting structures are lens structures formed in said near-field optical head.

3. Optical information recording and reading apparatus as set forth in claim 2, wherein cutouts are formed in said optical waveguide, and wherein at least one beam supported at its both ends is formed to resiliently support said near-field optical head.

4. Optical information recording and reading apparatus as set forth in claim 5, wherein said core is formed within the beam structure supported at its both ends, the beam structure being mounted in said optical waveguide.

5. Optical information recording and reading apparatus as set forth in claim 1, wherein said light-collecting structures are formed in said optical waveguide.

6. Optical information recording and reading apparatus as set forth in claim 5, wherein cutouts are formed in said optical waveguide, and wherein at least one beam supported at its both ends is formed to resiliently support said near-field optical head.

7. Optical information recording and reading apparatus as set forth in claim 6, wherein said core is formed within the beam structure supported at its both ends, the beam structure being mounted in said optical waveguide.

8. Optical information recording and reading apparatus as set forth in claim 1, wherein cutouts are formed in said optical waveguide, and wherein at least one beam supported at its both ends is formed to resiliently support said near-field optical head.

9. Optical information recording and reading apparatus as set forth in claim 4, wherein said core is formed within the beam structure supported at its both ends, the beam structure being mounted in said optical waveguide.

* * * * *